No. 829,483. PATENTED AUG. 28, 1906.
J. A. McCONNELL.
PIPE COVERING AND PROCESS OF MAKING SAME.
APPLICATION FILED AUG. 4, 1900.
2 SHEETS—SHEET 1.
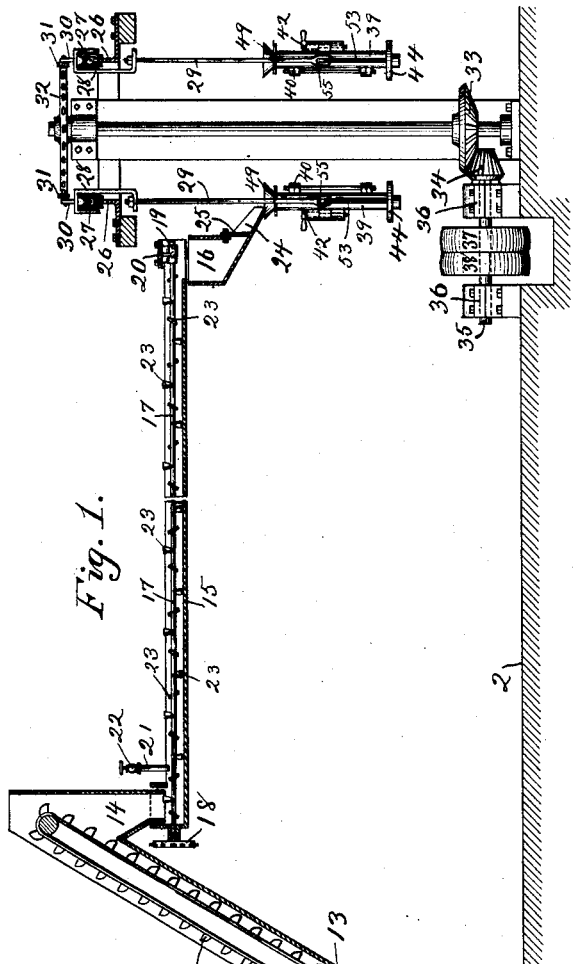
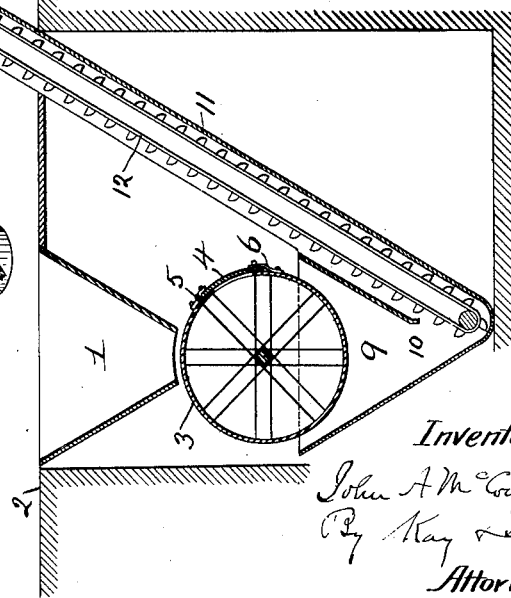
Witnesses:
Inventor:
John A. McConnell
By Kay & Totten
Attorneys.

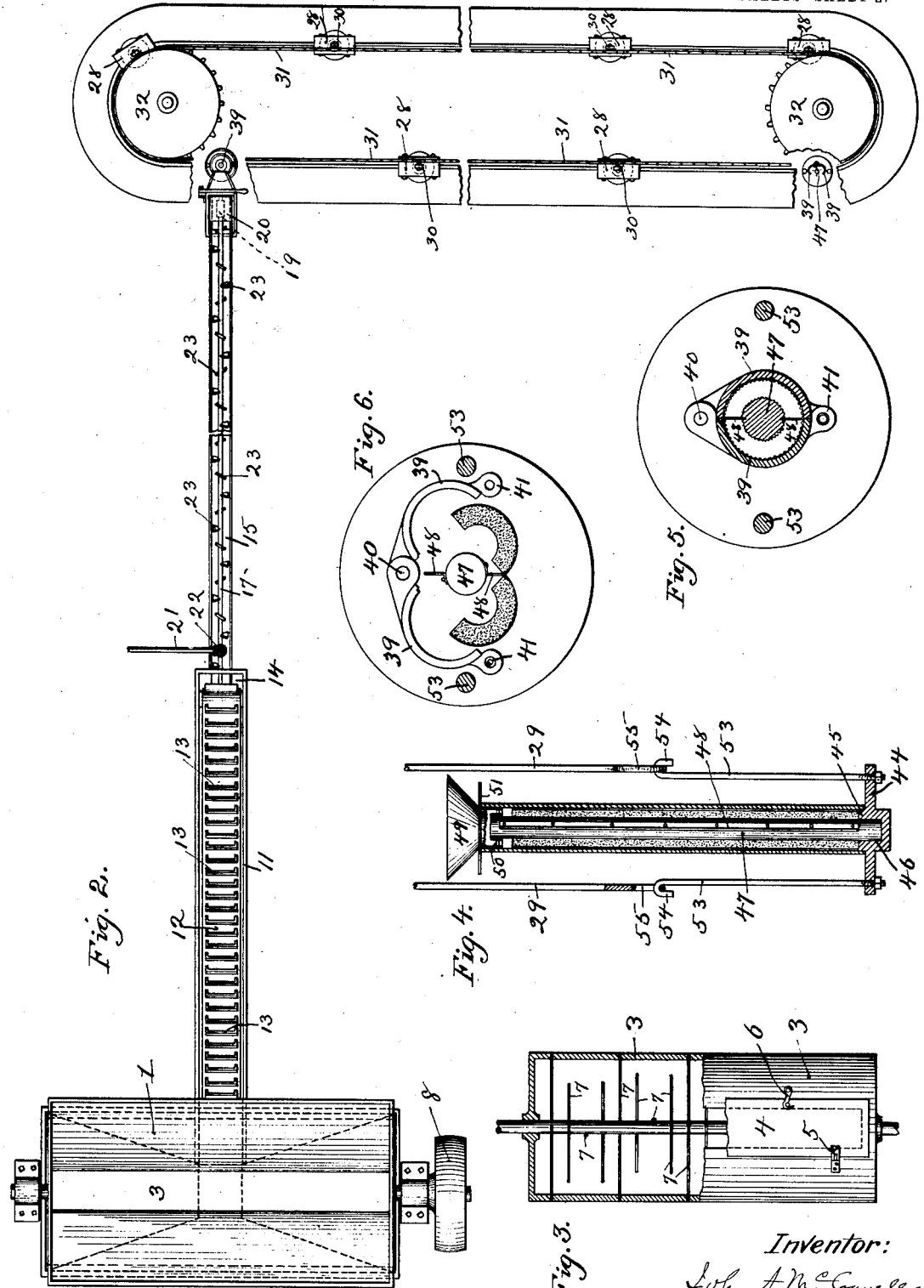

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

PIPE-COVERING AND PROCESS OF MAKING SAME.

No. 829,483.      Specification of Letters Patent.      Patented Aug. 28, 1906.

Application filed August 4, 1900. Serial No. 25,909.

*To all whom it may concern:*

Be it known that I, JOHN A. MCCONNELL, a resident of Allegheny, in the county of Allegheny and State of Pennsylvania, have invented a new and useful Improvement in Pipe-Covering and Process of Making Same; and I do hereby declare the following to be a full, clear, and exact description thereof.

My invention relates to non-conducting coverings for steam-pipes, refrigerator-pipes, boilers, &c., and to that class of non-conducting coverings which are molded from a mixture of plaster-of-paris, magnesia, cement, or other materials which set when water is added to them, and asbestos or other fiber, in combination with lime, infusorial earth, landplaster, or other suitable filling material, and to the process of making such non-conducting covering, and has for its object a process which is rapid and practically continuous and a covering of greater strength and heat-arresting power than the molded coverings heretofore manufactured. In the making of these coverings heretofore it has been the custom to wet the plastic material with sufficient water to reduce the same to a semiliquid condition. This wetting and mixing has been done in large batches and intermittently. As is well known, in the manipulation of any material which sets when water is added to it the setting process commences very quickly after the same is wet. Hence in molding non-conducting coverings from these large batches of wet plastic material in order that the molding can be completed before the latter part of the batch has set too much for molding it is necessary to commence molding before the batch is sufficiently stirred and before it is sufficiently thickened or stiffened by the first stages of setting. As a consequence the heavier particles settle to the bottom of the mixing-tank and also in the beginning of the molding operation the heavier particles settle to the bottom of the mold, making that portion of the section of covering too dense, while the top portion containing the lighter and thinner particles is too fragile. On the other hand, the process of setting or hydrating had so far advanced by the time the last portion of the batch was molded that the molding and manipulating of it at that stage broke the chemical union of the materials and made the covering brittle, and the setting already described also renders it too dense, thus greatly reducing the strength and quality of the covering and turning out a quantity of covering from the batch which was irregular in quality, that first molded from the batch being light and fragile, while that molded from the last portion of the batch was brittle and too heavy and dense by reason of the heavy particles having settled to the bottom of the tank. Furthermore, it is impossible to carry on the old process of molding continuously, for the reason that after a batch is mixed it has to be molded, and then while a second batch is being mixed the large number of employees necessary to mold the batch before setting are compelled to wait during the preparation of the batch and until the setting process begins, and the many hanlings and rehandlings of both the raw material and finished product render the batch process slow and expensive.

It is the object of my invention to overcome these defects and difficulties in the old process of making non-conducting coverings of this class; and it consists, essentially, in a process of continuously wetting a constant stream or rapidly intermittent small portions of the plastic material and molding the same at the same rate that it is being mixed with water; and to this end it consists in conveying a constant stream or rapidly intermittent portions of the plastic material to a given point and at the same time supplying a constant stream or rapidly intermittent portions of water at the same point and continuously mixing the water and plastic material in the requisite proportions and continuing the mixing until they are thoroughly commingled and conveying the same in a constant stream or rapidly intermittent portions to the point where it is to be molded. The term "plastic material" as used in this specification is intended to cover all plastic materials which set when water is added to them, such as plaster-of-paris, magnesia, and any of the well-known forms of hydraulic cement on the market.

To enable others skilled in the art to practice my invention, I will describe the same more fully, referring to the accompanying drawings, in which—

Figure 1 is a side view, partially in section, of an apparatus for carrying out my improved process. Fig. 2 is a diagrammatic plan view of the same. Fig. 3 is a detail view of the mixing-cylinder. Fig. 4 is a longitudinal sectional view of one of the molds. Fig. 5 is a transverse sectional view of the same somewhat modified. Fig. 6 is a plan view of the same, showing the mold open and contents being removed therefrom. Fig. 7 is a longitudinal section of the upper portion of the mold. Fig. 8 is a plan view of the same. Fig. 9 is a detail illustrating the locking means for the mold, and Fig. 10 is a perspective view of a section of non-conducting covering.

The magnesia, plaster-of-paris, cement, or other similar material, together with the asbestos or other fibrous material to be employed, is placed in the requisite proportions in the hopper 1, which is preferably located on a level with the floor 2. Below said hopper 1 is a rotating cylinder 3, provided on one of its sides with a door 4, suitably hinged, as at 5, to the casing of the drum and being held closed by any suitable means—as, for instance, by the hasps 6. Stretched across the interior of the drum from side to side are a series of wires or blades 7, said wires or blades being placed at various angles to the horizontal across said drum, so that they serve to thoroughly mix together and comb out the ingredients placed in said drum. The drum 3 has its shaft provided with a pulley or gear-wheel 8, working with a belt or a pinion by means of which the drum is rotated. Below the drum 3 is a hopper 9, the sides of which converge from each direction to an opening 10, which leads to the lower end of a conveyer-spout 11. In said spout is an endless conveyer 12, provided with buckets 13, by means of which the material is conveyed forward and discharged into the chute 14. This conveyer can be driven in any approved manner. The chute 14 leads into one end of a long mixing and conveying trough 15, preferably open at the top and having in the end opposite to where the chute 14 enters an opening leading into a hopper 16. Extending longitudinally through the trough 15 is a shaft 17, having a wheel or pulley 18 at one end by means of which motion is communicated to said shaft, said shaft being journaled at its inner end in the end of the trough 15 and at its outer end in a bearing 19, secured to a plate 20, extending across the trough. Adjacent the chute 14 is a water-pipe 21, provided with a suitable valve 22, whereby water is admitted to the trough, either constantly or at quick intervals. The shaft 17 is provided with a series of inclined blades 23, said blades being set at suitable intervals and at the requisite angle so that they thoroughly mix the material in the trough and at the same time convey it from the point where it is received to the hopper 16. The hopper 16 is provided with an opening leading to a spout 24, which conducts the material into the molds, and with a suitable gate 25 for closing said opening. Adjacent to the hopper 16 is an endless overhead track 26, upon which travel a series of trucks composed of the grooved wheels 27 and angle-hangers 28, to which are secured the rods 29 for supporting the molds. The various trucks are provided with projecting studs 30, suitably attached to a sprocket-chain 31, said chain lying above the track 26 and passing around suitable sprocket-wheels 32 at the ends of said track. The shaft of one of these sprocket-wheels 32 extends downwardly and is provided with a bevel-gear 33, which meshes with a bevel-pinion 34 on a shaft 35, mounted in suitable bearings, as at 36, and provided with a fast pulley 37 and a loose pulley 38 for communicating motion to the sprocket-chain and moving the trucks supporting the molds. The belt is shifted alternately from one of the pulleys 37 38 to the other, whereby an intermittent travel is given to the molds, which is necessary by reason of the molds having to pause beneath the spout 24 in order to receive the mixed plastic material, and this stoppage admits of the opening of the molds and removal of the molded covering at the discharge end of the overhead conveying-track. It is apparent that the molds might be conveyed away on a traveling table or belt; but the overhead track is preferred.

Each of the molds is made in two sections 39 39, hinged together, as at 40, and provided on their opposite edges with interlocking lugs 41, which are suitably perforated for receiving the locking-bolt 42, said locking-bolt being provided with eccentric portions, so that by turning the bolt the sections of the mold can be firmly drawn together and locked, as will be readily understood. A handle 43 is provided on the upper end of the bolt for turning the same. The mold-sections rest upon a bearing-plate 44, said plate being provided with a projecting rim 45, which fits into the lower end of the mold, and with a depression 46 for receiving the lower end of a mandrel 47. This mandrel is provided with diametrically opposite fins or webs 48, running the full length of said mandrel and suitably secured thereto, as by riveting or other suitable means, as shown in Fig. 4, or by having the fins fitted into a groove in the mandrel, as shown in Fig. 5. One of these fins is of a width equal to the space between the mandrel and the interior surface of the mold, while the other fin is of slightly less width, for a reason which will hereinafter appear. On the upper end of the mold is placed a funnel 49, said funnel projecting down into the mold and being provided with a spider 50, having a central ring for supporting and centering the upper end of the mandrel. The funnel is also provided with projecting wings 51 for supporting the funnel on the top of the mold when the mold is opened up, as shown in Fig. 6. Secured to the supporting-plate 44, on diametrically opposite sides thereof, are upwardly-projecting rods 53, said rods being provided at their upper ends with hooks 54, which engage eyes 55 on the lower ends of the supporting-rods 29. The rods 53 are of such length that the hooks on the upper end thereof lie slightly above the longitudinal center of the mold, so that the latter is held by gravity in an upright position. The hooks, in effect, form trunnions for supporting said molds.

In the working of my process the magnesia, cement, plaster-of-paris, or other plastic material, together with the asbestos or other fibrous material, is dumped in the proper proportions and in comparatively large quantities into the hopper 1, the cylinder 3 being in such position that its door-opening is beneath the hopper 1, so that the material passes into the drum. The door 4 is then closed and the cylinder rotated, whereby the wires or blades 7 comb out and thoroughly mix the ingredients, after which the material is dumped into the hopper 9 and a fresh charge put into the drum and the dry mixing repeated. While I prefer the rotating mixer-drum with the combing-wires, as shown, it will be apparent that a stationary drum with wires or mixing-blades revolving therein will accomplish substantially the same result, while the material may be fed continuously into one end of the mixing-drum by a hopper and discharged continuously at the other end of the drum. From the hopper 9 the mixed material is conveyed slowly and practically in a continuous stream to the chute 14, a sufficient amount of material having been dumped into the hopper 9 to last until the next charge in the drum 3 is thoroughly mixed. Upon being received in the trough 15 the material is continuously or at quick intervals supplied with the requisite quantity of water from the pipe 22, and by the rotation of the shaft 17 the blades thereon thoroughly mix the water and plastic material and slowly convey the same to the hopper 16. By the time it reaches the hopper 16 the material has thickened or set sufficiently for the molding operation to be carried on to the best advantage and is then introduced, by means of the spout 24, into the molds. The molds are moved underneath the spout by the sprocket-chain, stopped there for receiving the material, and after being filled the gate 25 is closed and the sprocket-chain 31 again put in motion, thereby moving a mold away from the spout 24 and bringing the next mold underneath said spout, when the sprocket-chain is again stopped and the gate 25 opened to admit the material to this mold, and so on continuously.

The molding operation takes place at the same rate as the mixing operation, so that as soon as the plastic material has thickened or set sufficiently for molding it is immediately molded, thereby preventing any settling of the heavier particles to the bottom of the mold or batch and also obviating the too firm setting of the material for molding. As a result the sections are uniform in texture throughout, and all of the sections of a batch are of exactly the same quality. The molds are moved intermittently preferably toward the dry-house until the covering is thoroughly set, when it is removed from the mold and placed in the dry-house.

While I have shown upright tubular molds, it is readily apparent that trough or half-cylindrical molds or any other form of open-top mold may be used by placing them horizontally and supporting them from a trolley at each end. They would be caused to pass under the spout in quick succession to be filled and conveyed away the same as the upright molds.

While in the claims I have specified the wetting of the material in substantially a continuous stream, I wish it understood that I do not exclude the wetting of the material in rapidly intermittent portions, but only exclude the wetting of the same in such an intermittent manner as to practically constitute a "batch" method. The wetting of the material, however, may be done in portions, but in such a rapidly intermittent manner as to constitute practically a continuous stream, and such modification I consider within the scope of the claims.

Non-conducting coverings when molded of magnesia, plaster-of paris, cement, or similar material are necessarily quite fragile. In order to strengthen the same and also form dead-air spaces to assist in preventing the escape of heat, I apply to the outer surface thereof during the molding operation fluted or corrugated paper-board, such as strawboard or asbestos-board, or stiff sized cloth or fluted or corrugated sheet metal or other fluted strengthening material. This may best be done by placing in the mold a sheet of the fluted material, said sheet extending around the interior of the mold and having its edges meet on opposite sides of the wider of the two fins or webs 48, the opposite or narrower of said webs fitting at its outer edge against the inner face of the corrugated or fluted strengthening-sheet. The mold containing such strengthening-sheet is then filled with plastic material, and the setting of the latter embeds the corrugations of the strengthening-sheet in and firmly unites it to the plastic material, thereby reinforcing the latter and at the same time forming heat-insulating air-cells, and the two sections of the covering may be united by the outer strengthening-sheet, so as to form practically a hinge, as shown in Fig. 6. When using corrugated metal, I prefer to embed it in the surface of the covering, so that a thin stratum of the insulating material is on the outside of said metal, thereby excluding the air from the metal and preventing its rusting. The metal, however, need only be embedded on one side in the insulating material, the outer surface thereof being protected by a sheet of paper, cloth, or similar material. When, however, it is only desired to form fluted air-cells on one or both surfaces without applying the strengthening-sheet, I use a fluted mold and mandrel, as shown in Fig. 5.

The apparatus shown herein is claimed in my application filed July 18, 1903, Serial No. 166,087.

What I claim as my invention, and desire to secure by Letters Patent, is—

1. The process of making non-conducting coverings in which material which sets when water is added thereto is an ingredient, which consists in mixing the material in a substantially continuous stream with an excess of water to reduce the same to a substantially liquid condition, quickly agitating the same until the first stages of setting have commenced, and then filling the same into molds and allowing the same to set.

2. The process of making non-conducting coverings, which consists in mixing in a dry state fibrous material and materials which set when water is added thereto, mixing said materials in a substantially continuous stream with an excess of water to reduce the same to a substantially liquid condition, thoroughly and quickly agitating the same until the first stages of setting have commenced, and then filling the same into molds and allowing the same to set.

3. The process of making non-conducting coverings in which material which sets when water is added thereto is an ingredient, which consists in mixing the material in a substantially continuous stream with an excess of water to reduce the same to a substantially liquid condition, thoroughly and quickly agitating the same and feeding the same forward in a continuous stream, and then filling the same into molds as rapidly as the proper degree of setting has commenced and allowing the same to set in said molds.

4. The process of making non-conducting coverings in which material which sets when water is added thereto is an ingredient, which consists in mixing the material with an excess of water to reduce the same to a substantially liquid condition, thoroughly and quickly agitating the same until the first stages of setting have commenced, and then filling the same into molds in which reinforcing or strengthening sheets have been placed and allowing the same to set therein, whereby said reinforcing-sheets are embedded in the surface of said coverings.

5. The process of making non-conducting coverings in which material which sets when water is added thereto is an ingredient, which consists in mixing the material in a substantially continuous stream with an excess of water to reduce the same to a substantially liquid condition, thoroughly and quickly agitating the same until the first stages of setting have commenced, and then filling the same into molds in which corrugated or fluted paper-board or the like is contained and allowing the same to set therein, whereby said fluted paper-board is embedded in the surface of the covering.

6. The process of making non-conducting coverings in which material which sets when water is added thereto is an ingredient, which consists in mixing the material with an excess of water to reduce the same to a substantially liquid condition, quickly and thoroughly agitating the same until the first stages of setting have commenced, and immediately filling the same into tubular molds at the inner surface of which a reinforcing or strengthening sheet is held and allowing the same to set therein, whereby said reinforcing sheet is embedded in the outer surface of the tubular covering.

7. A non-conducting covering composed of molded material which sets when water is added thereto, said covering being of tubular form and having adhering to its outer surface a strengthening or reinforcing sheet provided with ribs which are embedded in the covering, said sheet being relatively thin compared to the thickness of the covering and being sufficiently rigid to stiffen and reinforce the same.

8. A non-conducting covering composed of molded material which sets when water is added thereto, said covering being of tubular form and having adhering to its outer surface a corrugated or fluted strengthening-sheet whose corrugations are embedded in the covering thereby producing longitudinal corrugations on the outside thereof, said sheet being relatively thin compared to the thickness of the covering and being sufficiently rigid to stiffen and reinforce the same.

9. A non-conducting covering composed of molded material which sets when water is added thereto, said covering being of tubular form and having its inner surface provided with longitudinal corrugations, and having adhering to its outer surface a corrugated strengthening-sheet whose corrugations are embedded in the covering, thereby stiffening and reinforcing the covering and producing longitudinal corrugations on the outside thereof.

In testimony whereof I, the said JOHN A. McCONNELL, have hereunto set my hand.

JOHN A. McCONNELL.

Witnesses:
F. W. WINTER,
ROBERT C. TOTTEN.